United States Patent [19]
Vits et al.

[11] Patent Number: 6,123,388
[45] Date of Patent: Sep. 26, 2000

[54] RESTRAINT SYSTEM FOR A SCHOOL BUS SEAT

[75] Inventors: Charles G. Vits, Carmel; Christopher W. Foye, Indianapolis, both of Ind.

[73] Assignee: Indiana Mills & Manufacturing, Inc., Westfield, Ind.

[21] Appl. No.: 09/183,088

[22] Filed: Oct. 30, 1998

[51] Int. Cl.[7] ...................................................... B60N 2/42
[52] U.S. Cl. .................................. 297/216.13; 297/452.2; 297/483; 297/232
[58] Field of Search ........................ 297/216.13, 216.14, 297/483, 468, 464, 452.2, 232

[56] References Cited

U.S. PATENT DOCUMENTS

| | | | |
|---|---|---|---|
| 4,919,488 | 4/1990 | Deegener | 297/468 |
| 5,015,010 | 5/1991 | Homier et al. | 280/808 |
| 5,246,271 | 9/1993 | Boisset | 297/483 |
| 5,575,533 | 11/1996 | Glance | 297/232 |
| 5,645,316 | 7/1997 | Aufrere et al. | 297/216.13 |
| 5,746,476 | 5/1998 | Novak et al. | 297/216.13 |
| 5,782,537 | 7/1998 | Leistra et al. | 297/216.13 |
| 5,823,627 | 10/1998 | Viano et al. | 297/483 X |

*Primary Examiner*—Anthony D. Barfield
*Attorney, Agent, or Firm*—Woodard, Emhardt, Naughton, Moriarty & McNett

[57] ABSTRACT

A passenger restraining harness and support assembly for use with a bench seat mounted in a vehicle. The bench seat includes a frame having a seat support portion with a front portion and a rear portion, a seatback portion coupled to the seat support portion, and legs or supports anchoring the seat to the vehicle. A harness support assembly includes a tower member with a slotted bottom end pivotally coupled to the rear of the seat support portion, a connecting member having one end adapted to fit into the slot in the tower member and a second end connected to the front of the seat support portion, a belt guide connected to the top of the tower member, and an anchor wing connected to the connecting member. A belt or harness attaches to the support assembly.

13 Claims, 12 Drawing Sheets

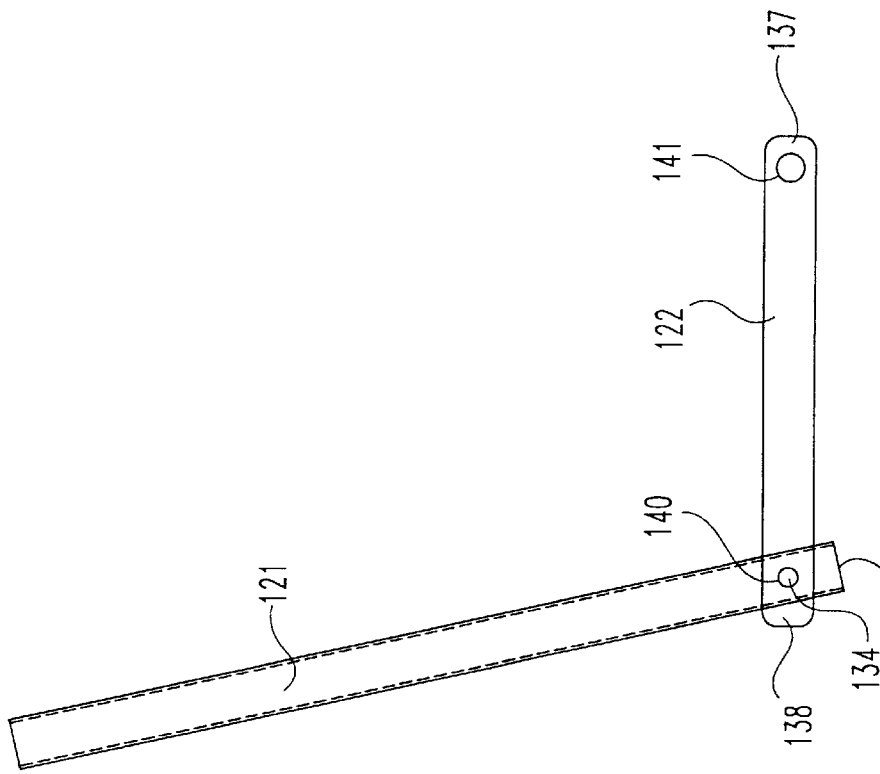

RESTRAINT SYSTEM FOR A SCHOOL BUS SEAT

BACKGROUND OF THE INVENTION

1. Field of the Invention

The present invention is in the field of seat belts used to provide a protective passenger environment.

2. Description of the Prior Art

Conventional seat belt systems combining a lap belt and an upper torso belt are well known. These three-point restraint systems are usually used with seats offering rigid support for the belts. As typically used in a vehicle, the three-point restraint system consists of single belt having its opposite ends mounted to a pair of retractors with a seat belt tongue connected to the belt intermediate to the belt ends. The tongue may be swung across the person and engaged with a buckle affixed to the seat thereby positioning one portion of the belt across the lap and another portion of the belt across the upper torso. In some systems, only one end of the belt is mounted to a retractor while the other end is anchored to the seat or vehicle. Seat belts are active restraint devices, requiring a passenger to actively engage the restraints for them to be effective.

School bus passenger seats usually do not employ active restraint safety devices, but instead rely on a passive restraint seat design. School bus passenger seats are built to specifications conforming to the safety standards set by the National Highway Traffic Safety Administration, DOT. These are codified as 49 C.F.R. Ch.V, § 571.222, Standard No. 222, and require that the seat back bend or deflect forward when a force is applied to the rear of the seat back. The code further specifies that 4000 W inch-pounds of energy must be absorbed within a maximum forward deflection of the seat back of 14 inches and 2800 W inch-pounds be absorbed within a maximum rearward deflection of the seat back of 10 inches where W represents the number of seating positions for which the seat is designed. 49 C.F.R., Ch.V, § 571.222, S5.1.3–5.1.4. The code specifies a passive restraint system, and does not require any sort of active restraints, such as a two-point passenger restraining lap belt or a three-point passenger restraining lap belt and torso harness combination. Children riding the school bus are protected in head-on collisions by the seat back in front of them deflecting forward and absorbing some of their forward momentum.

Vehicles with deforming or deflecting seats provide special problems regarding the integration of active restraint seat belt systems. Passive restraint systems are designed to protect a passenger who has been thrown forward by having the impacted seat back deflect upon impact of the thrown passenger and absorb some of their momentum. In a school bus seat combining active and passive restraint systems, both of the restraint systems have to be able to perform their functions and the seat must still conform to the regulations set forth in 49 C.F.R.

In U.S. Pat. No. 5,746,476, there is disclosed an automotive seat having a tower frame associated with the harness to transmit impact loads to the floor. Despite the prior devices, there is still a need for increased protection for children riding the school bus in an emergency or crash situation. The addition of an active restraint system, such as a three-point lap belt and torso harness combination, would provide enhanced passenger protection in a head-on crash as well as providing passenger protection in a broadside collision and/or roll situation. Disclosed herein is a three-point lap belt and torso harness passenger restraint system that is compatible with the pivoting and deflecting seats required by 49 C.F.R.

SUMMARY OF THE INVENTION

One embodiment of the present invention is a three-point lap belt and torso harness passenger restraint system for a school bus having forward-facing bench seats fastened to the vehicle floor and having forward pivoting and deflecting seat backs, comprising a lap belt and torso harness combination connected to a support structure positioned within the bench seat and coupled to the floor of the vehicle. The support structure includes a connecting member connected to the seat support and a tower member pivotally coupled to the seat support. The tower member includes a vertical slot that accepts one end of the connecting member, and both the tower member and the connecting members have coincident apertures through which a portion of the seat support may extend. The tower member lies in the plane of the seat back and is adapted to pivot through a predetermined angle around the rear of the seat support. The relative dimensions of the intersecting slot and connecting member determine the pivot angle.

In another embodiment of the present invention, a three-point lap belt and torso harness passenger restraint system for use with attached school bus seats having forward deflecting seat backs, comprises a three-point harness combination connected to a support structure coupled to the seat support and the vehicle. The support structure includes a connecting member connected to the seat support, a tower member connected to the connecting member and pivotally coupled to seat support, and a crossbar member connected to the front and rear portions of the seat support. The lower end of the tower member is connected to the connecting member, and the tower member is intermediately pivotally mounted to a seat support member. The tower member extends into the seat back and is adapted to pivot through a predetermined angle in response to a force acting thereon. As in the previous embodiment, a belt or harness system attached to the pivoting support structure allows a passenger to pivot forward sufficiently to allow the seat back to deflect according to specification, while holding the passenger in the seat.

It is an object of the present invention to provide an active restraint system compatible with existing passive restraint school bus seats and the present Federal safety regulations.

A further object of the present invention is to provide an active restraint system for school bus passengers.

Related objects and advantages of the present invention will be apparent from the following description.

BRIEF DESCRIPTION OF THE DRAWINGS

FIG. 2a is a partial side elevation view of the embodiment of FIG. 1.

FIG. 2b is a front elevation view of the tower member of the embodiment of FIG. 1.

FIG. 3b is an enlarged side fragmentary elevation view of the slot in the tower member of FIG. 3a.

FIG. 5a is a side elevation view of the embodiment of FIG. 4a.

FIG. 6a is a side elevation view of the connecting member of the embodiment of FIG. 4a.

FIG. 6b is a front elevation view of one vertical piece of the tower member of FIG. 4a.

FIG. 6c is a side elevation view of one vertical piece of the tower member of FIG. 4a.

FIG. 7 an enlarged perspective view of the crossbar member of the second embodiment of FIG. 4a.

DESCRIPTION OF THE PREFERRED EMBODIMENTS

Figure 1A:
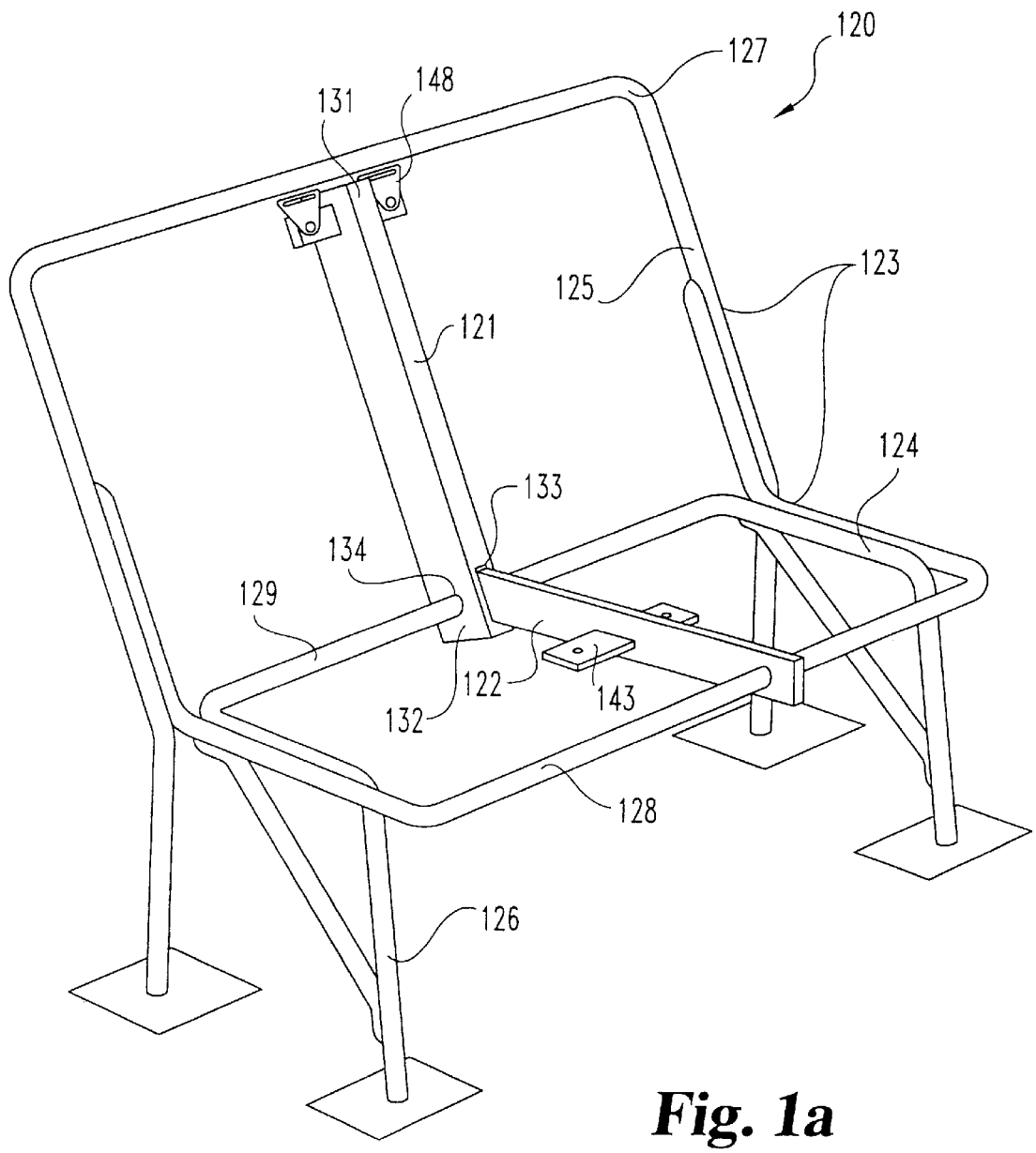
FIG. 1a is a perspective view of a bench seat frame incorporating a first embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1B:
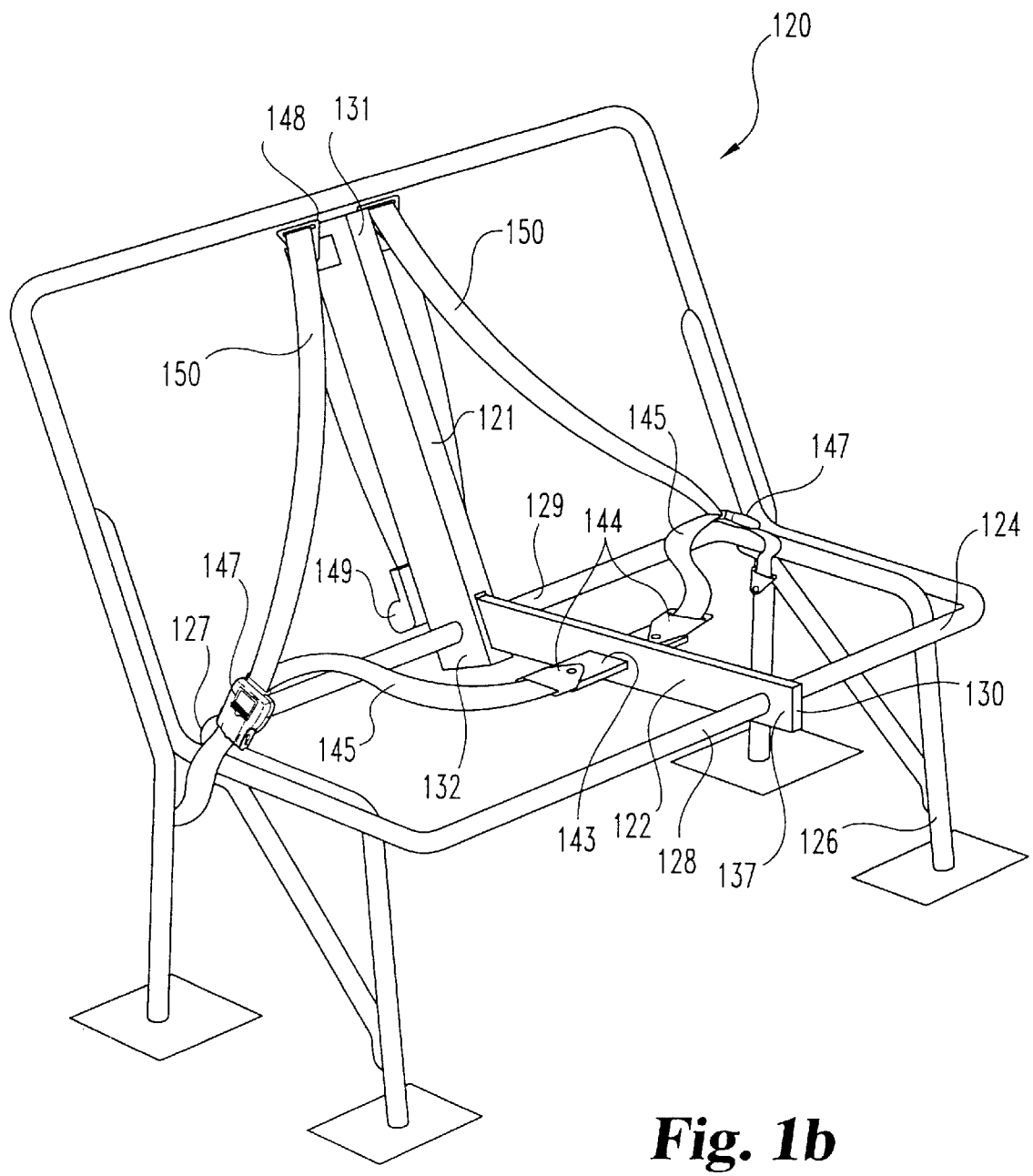
FIG. 1b is the same view as FIG. 1a with the addition of an attached seat belt assembly.
Figure 2C:
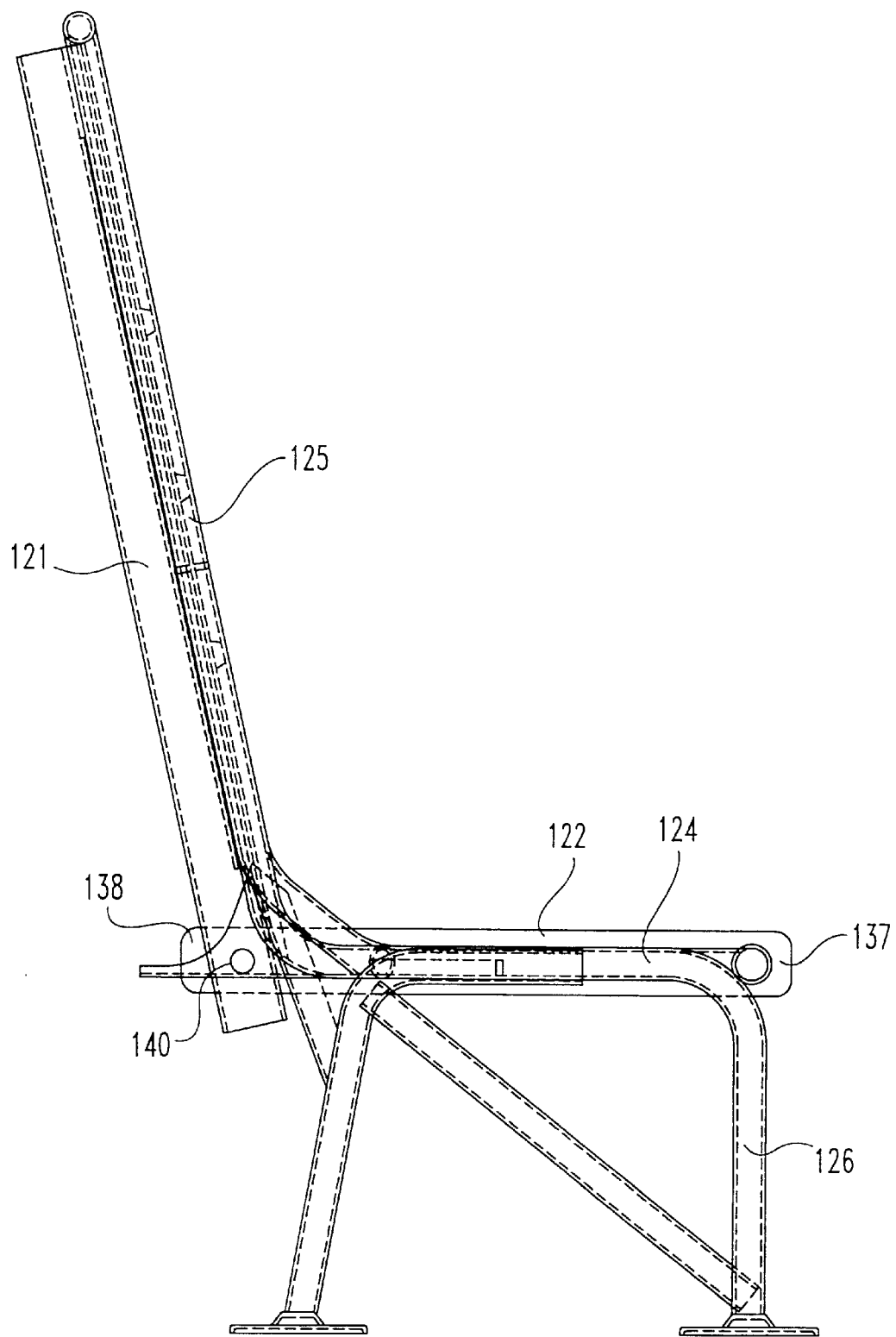
FIG. 2c is a side elevation view of the embodiment of FIG. 1 coupled to a bench seat frame.
Figure 2D:
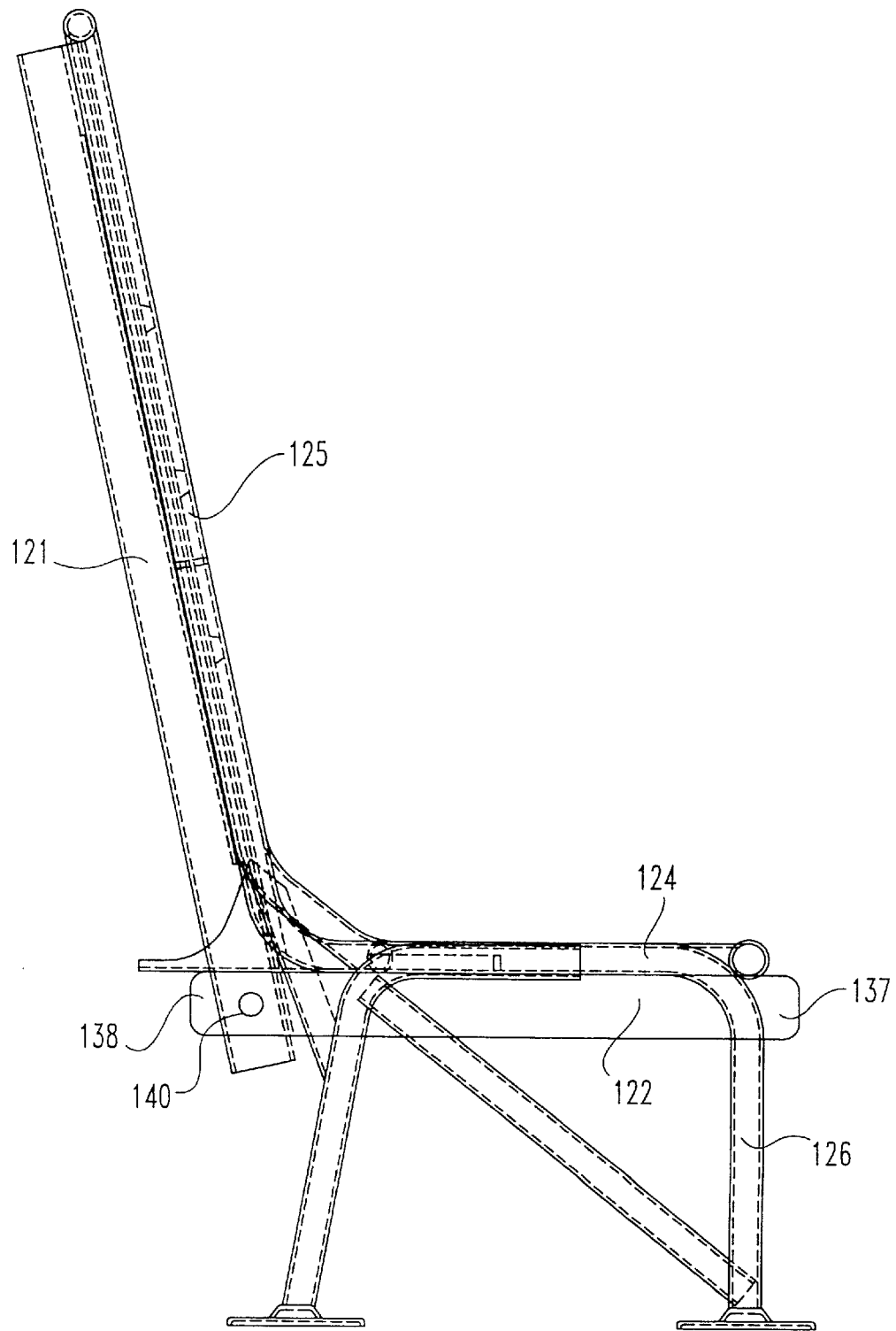
FIG. 2d is a side elevation view of the embodiment of FIG. 1 mounted below a bench seat frame.
Figure 3C:
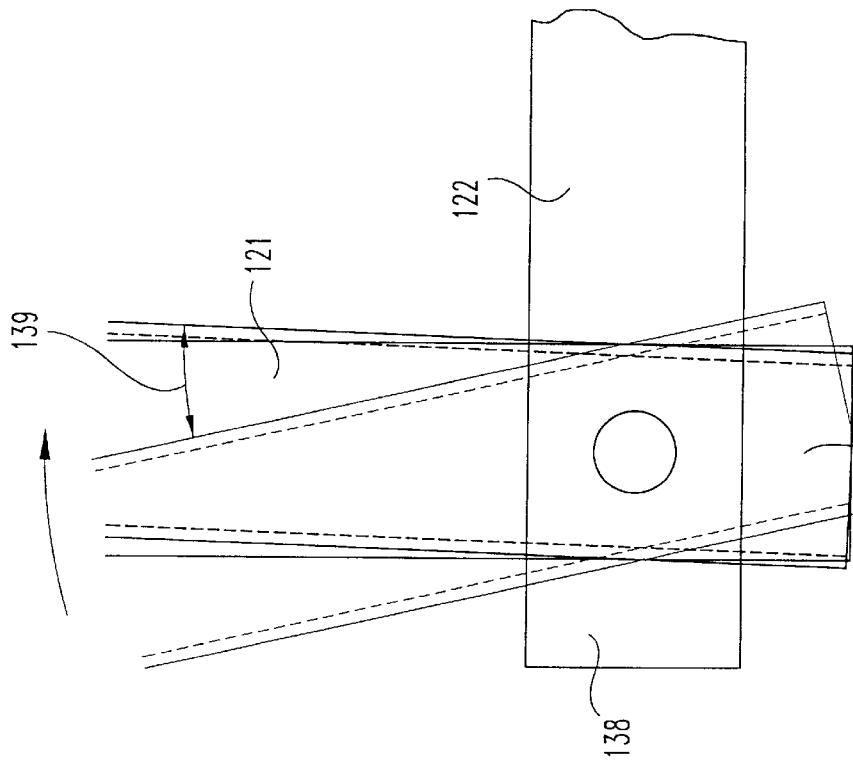
FIG. 3c is an enlarged side fragmentary elevation view of the intersection of the tower member and the connecting member, showing the rotation of the tower member.
Figure 3B:
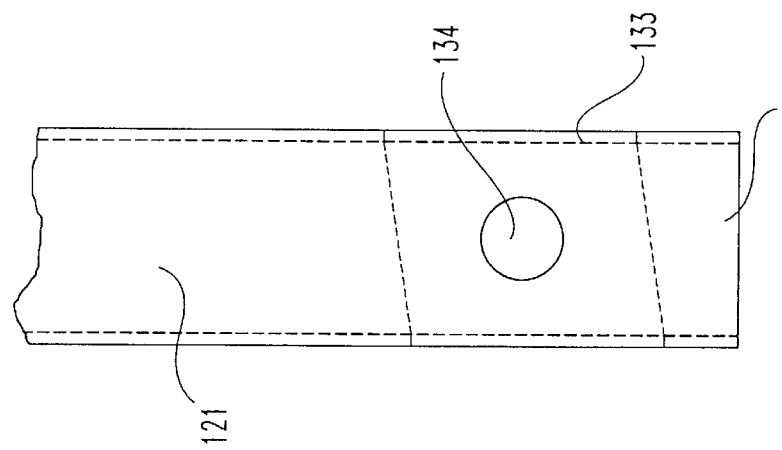
Figure 3A:
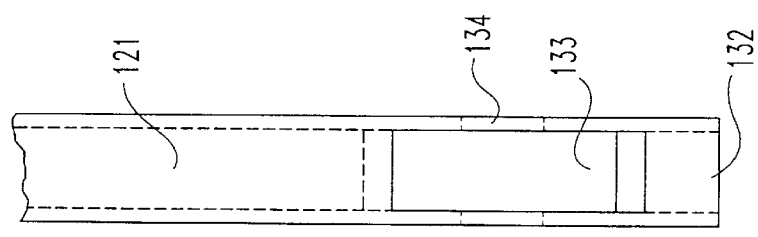
FIG. 3a is an enlarged fragmentary front elevation view of the slot in the tower member of the embodiment of FIG. 1.
Figure 4A:
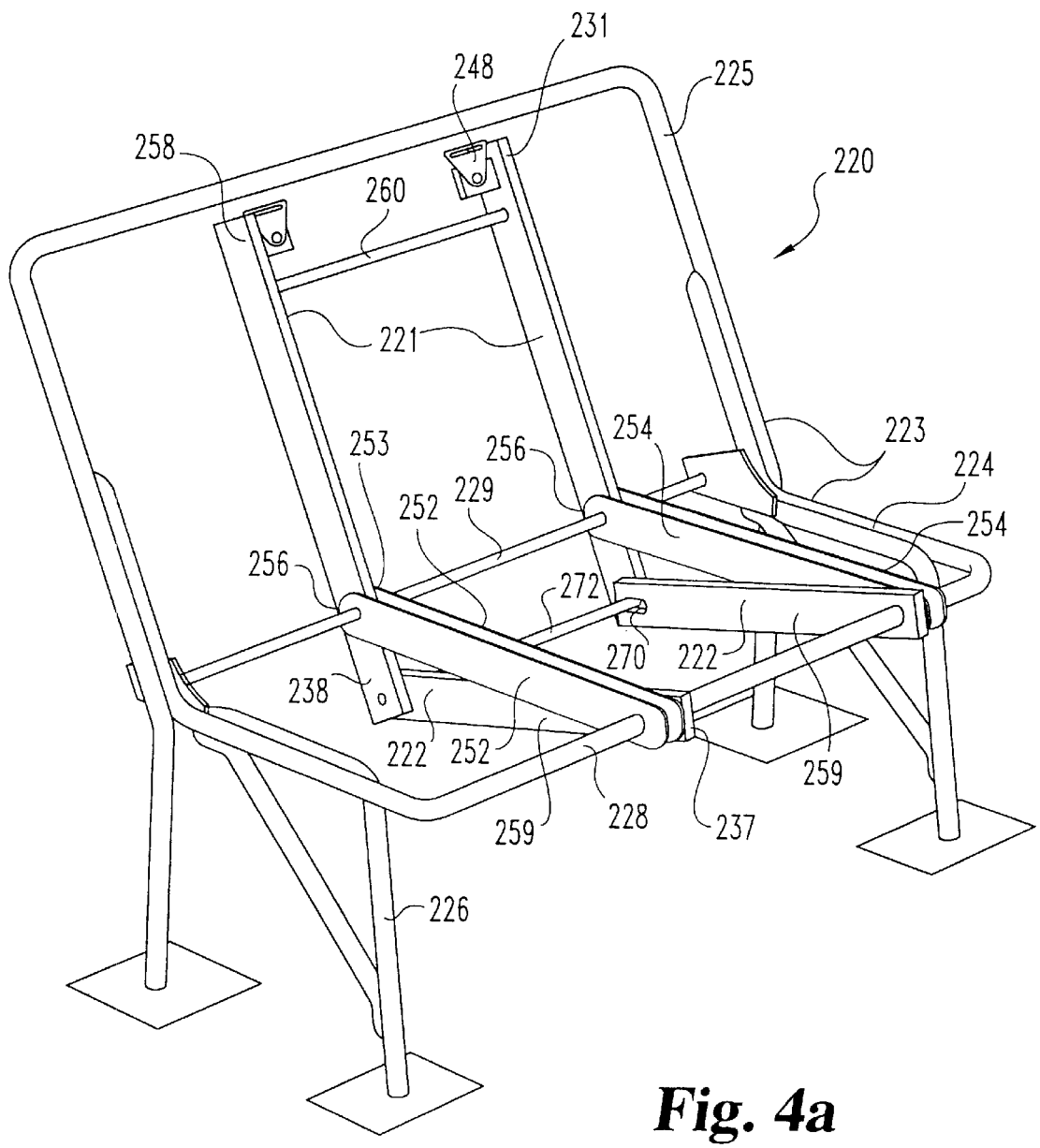
FIG. 4a is a perspective view of a bench seat frame incorporating a second embodiment of the present invention.
Figure 4B:
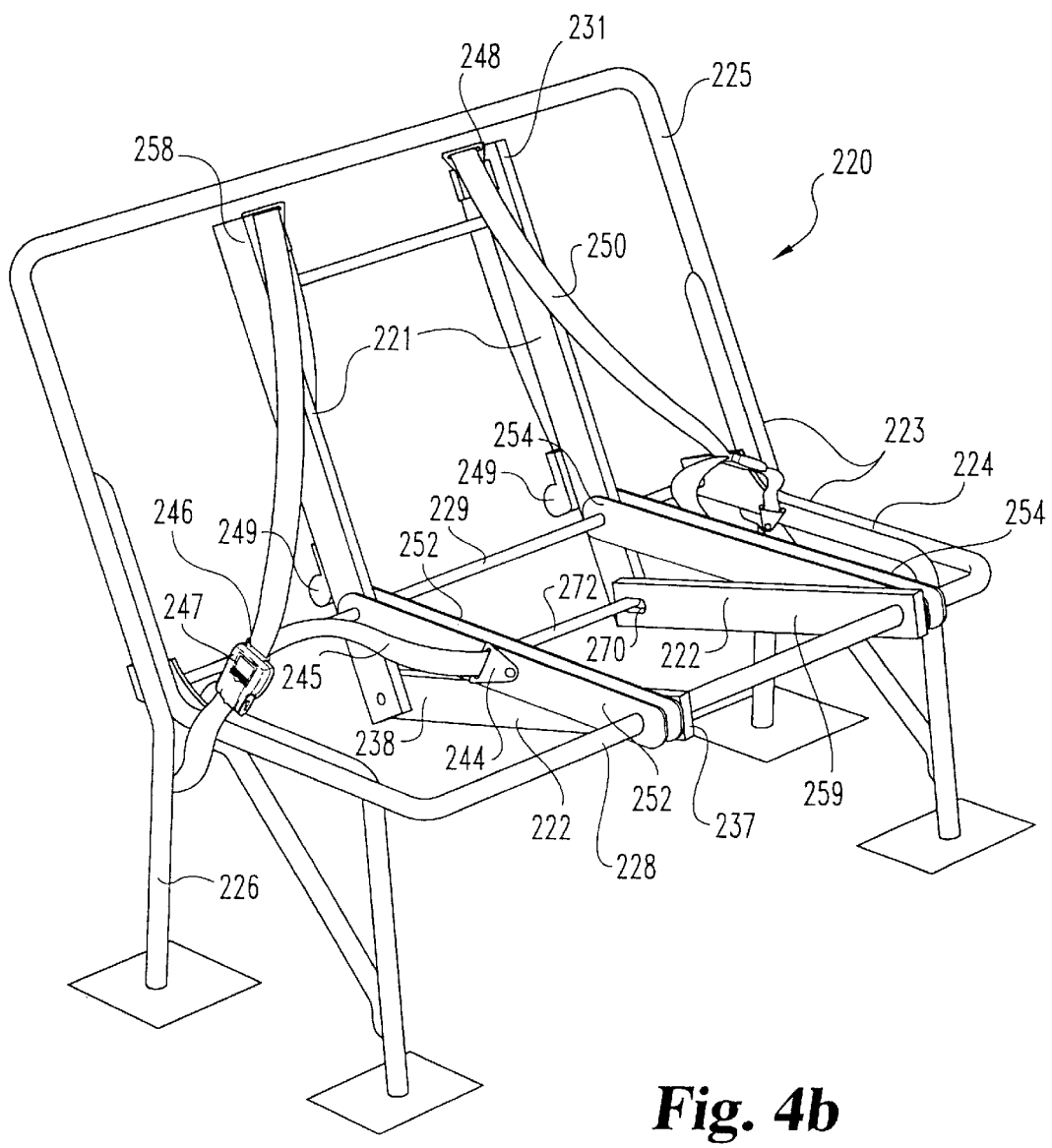
FIG. 4b is the same view as FIG. 4a with the addition of an attached seat belt assembly.
Figure 5C:
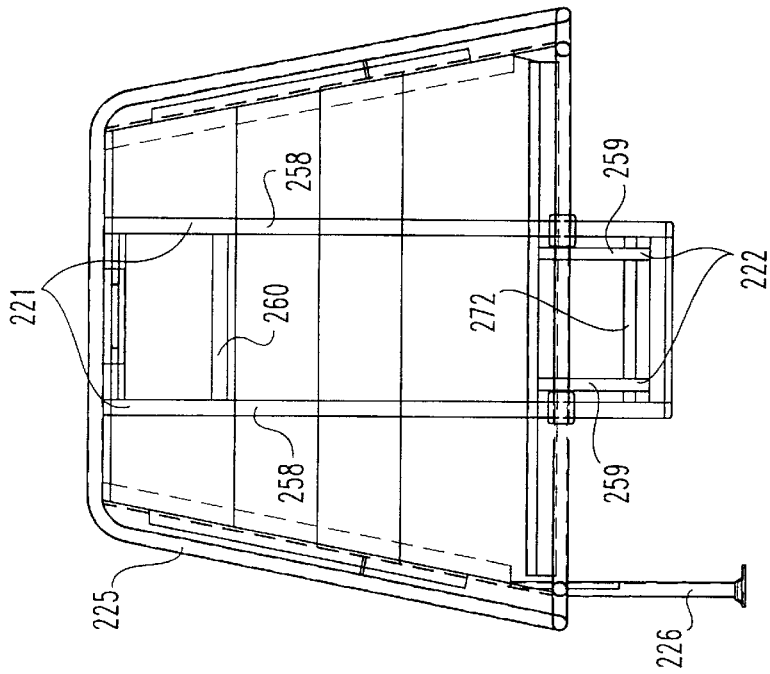
FIG. 5c is a partial front elevation view of the embodiment of FIG. 4b.
Figure 5B:
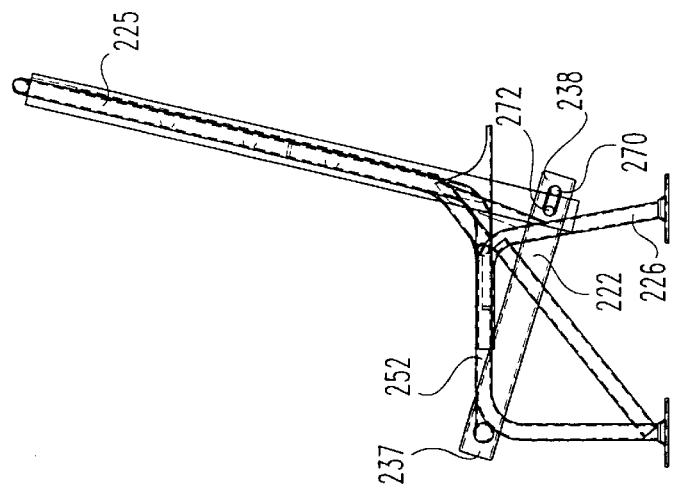
FIG. 5b is a side elevation view of the embodiment of FIG. 4b.
Figure 5A:
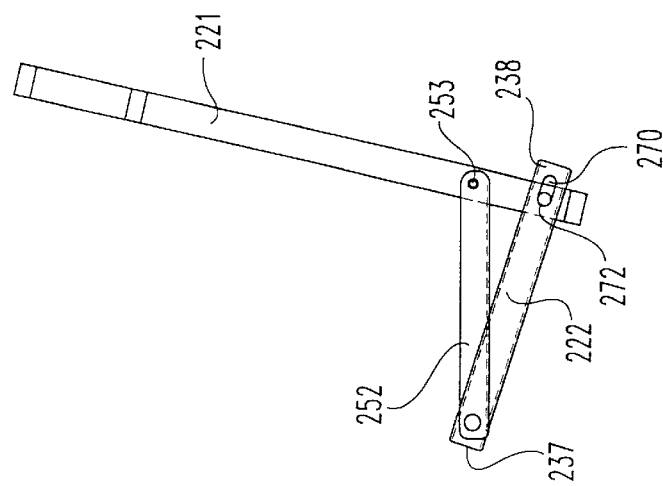
Figure 6A:
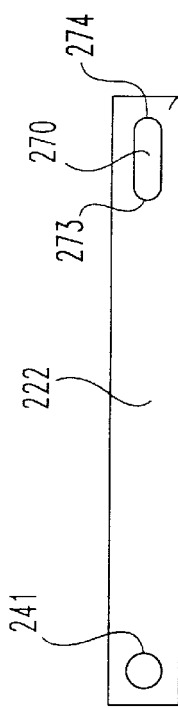
Figure 6B:
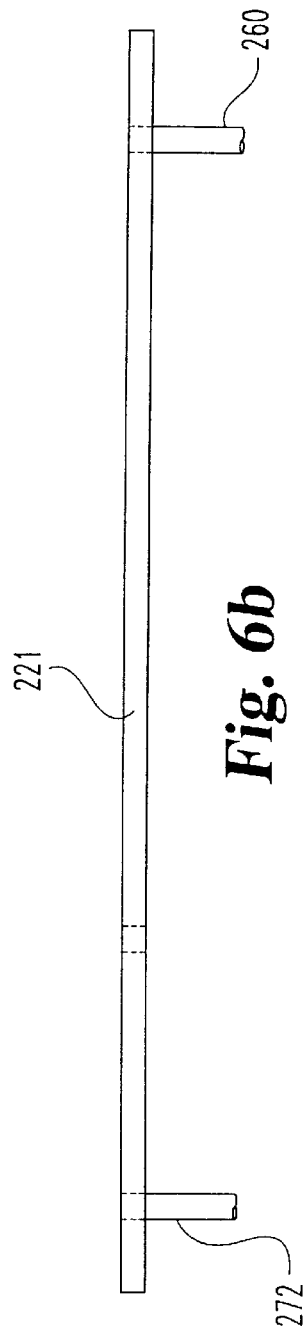
Figure 6C:
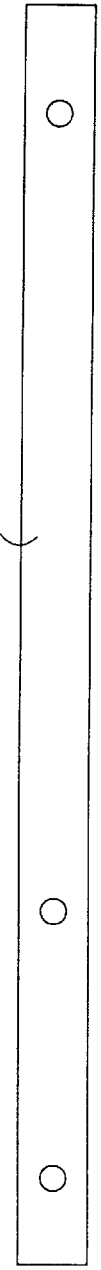
Figure 7:
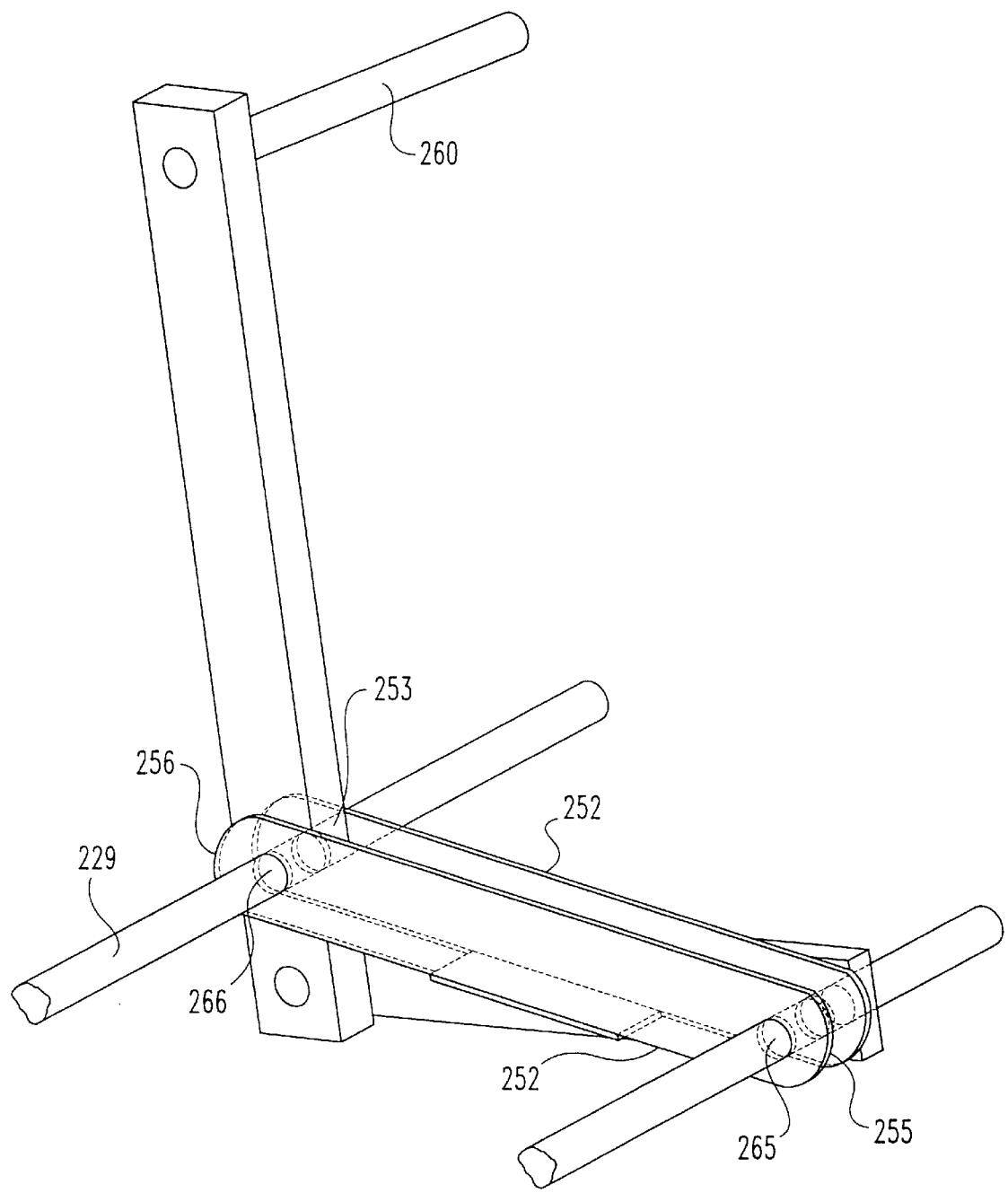
Figure 8:
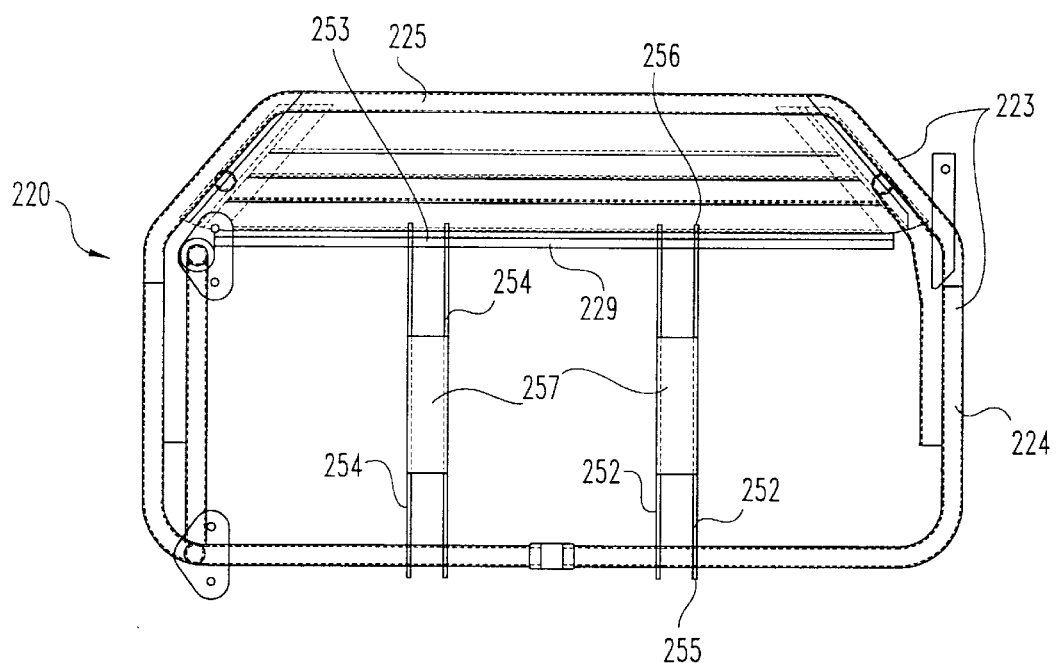
FIG. 8 is a top plan view of the embodiment of FIG. 4b.

Referring now more particularly to the drawings, FIGS. 1 through 3 show a three-point restraint system 120 incorporating a first and preferred embodiment of the present invention. The restraint system 120 is designed to restrain two passengers sitting side by side. The restraint system 120 includes a tower member 121 movably coupled to a connecting member 122, and is adapted to be mounted to a conventional school bus passenger seat frame 123. Tower member 121 is adapted to move independently relative to seat frame 123. Preferably, tower member 121 is adapted to pivot relative to seat frame 123. The members comprising restraint system 120 are formed from steel or any convenient structural material. Seat frame 123 includes a seat support portion 124 connected to a seat back portion 125 and also connected to a leg portion 126 adapted to be affixed to a surface, such as the floor of a school bus. Seat support portion 124 is typically formed from one or more bent metal tubes 127 and includes a front portion 128 and a rear portion 129. Seat support portion 124 may be wrapped or embedded in a cushion upon which a passenger may sit. Seat back 125 portion, also formed from bent metal tubes 127, may likewise be cushioned.

Connecting member 122 is formed having a rectangular cross-sectional shape 130, although in other embodiments connecting member 122 may have any convenient cross-sectional shape. Tower member 121 has a top end 131 and a bottom end 132. Bottom end 132 includes a slot 133 shaped to accept connecting member 122 and a pair of parallel apertures 134 perpendicular to slot 133 through which rear portion 129 of seat support portion 124 may pass to couple tower member 121 to seat frame 123. Tower member 121 lies in the plane defined by seat back portion 125 with the top end of tower member 121 extending substantially into seat back portion 125.

Connecting member 122 has a front end 137 and a rear end 138, and includes a rear aperture 140 through which rear portion 129 may extend to mount connecting member 122 to seat 123. Connecting member 122 is inserted into slot 133 in tower member 121. In operation, tower member apertures 134 may be aligned coincident with connecting member rear aperture 140 enabling rear metal tube 129 to be passed therethrough, coupling tower member 121 and connecting member 122 to seat support portion 123 and to each other. Connecting member 122 further includes front aperture 141 through which front portion 128 extends, mounting connecting member 122 to seat 123. (See FIG. 2c) Alternatively, connecting member 122 may be affixed to seat support portion 124 by any convenient fastening means. (See FIG. 2d)

In operation, connecting member 122 lies in the plane defined by seat support portion 124. Both tower member 121 and connecting member 122 may be embedded in cushions that simultaneously provide passenger comfort and prevent restraint system 120 from moving or jiggling. In the preferred embodiment, tower member 121 is pivotally coupled to seat support portion 124. A stop means operable to limit the movement of tower member 121 is provided by the presence of connecting member 122 in slot 133, which limits the pivot angle 139 (see FIG. 3c) through which tower member 121 may be rotated. While the preferred stop means is connecting member 122 filling slot 133, any convenient stop means may be used. It is preferable that the pivot angle 139 through which tower member 121 may pivot is acute. It is more preferable that the pivot angle 139 be about 17 degrees, corresponding to the maximum allowed deflection of seat back portion 125 caused by two unbelted passengers striking seat back 125 from behind and two belted passengers pulling on tower member 121 from the front. Slot 133 preferably extends through tower member 121 at a slight angle to the normal, such that when connecting member 122 engages tower member 121 connecting member 122 may rest in the horizontal plane of seat support portion 124 while tower member 121 remains tilted backwards a few degrees to the vertical. (See FIG. 3c) In this embodiment, the dimensions of connecting member 122 and slot 133 are sized relative to each other such that tower member 121 may rotate forward through a maximum of 17 degrees. (See FIG. 3c)

Restraint system 120 also includes anchor wing 143 connected to connecting member 122. A seat belt anchor 144 is fixedly attached to anchor wing 143, becoming one point of a three-point restraint. (See FIG. 1b) Seat belt anchor 144 connects lap belt 145 terminating in a tongue 146 to seat frame 123. Alternatively, two seat belt retractors could be attached to both anchor wings 143, retractably connecting lap belts 145 thereto. Restraint system 120 further includes a buckle 147 fixedly attached to seat support portion 124 and adapted to lockingly engage tongue 146. Restraint system 120 further includes a pair of guides 148, such as, a conventional D-loop, attached near the top of tower member 121. A pair of torso belt retractors 149 are connected to tower member 121, each housing a torso belt 150 and becoming the second point of the three-point restraint. The torso belt 150 is extended upwardly through guide 148 and downwardly across the torso of a seated passenger. The extending end of torso belt 150 also connects to tongue 146. When tongue 146 is locked in buckle 147, buckle 147 becomes the third point of the three-point restraint. Alternatively, a single belt (not shown) may extend between retractor 149 and anchor 144 with a tongue (not shown) slideably mounted intermediate thereto.

In operation, the invention adds active passenger restraint protection to the passive restraint already provided by the deflecting school bus seats. Tower member 121 does not interfere with the passive restraint function of the seat back 125, since tower member 121 is adapted to pivot forward along with the seat back 125 in response to a rear impact. Seat back portion 125 deflects forward in response to a forward force applied thereto consisting of a passenger located rearward of the seat back portion 125 impacting seat back portion 125 and/or a forward force applied to support tower 121 via torso belt 150 by a seated passenger pulling against the torso belt 150.

Another embodiment of the present invention is shown in FIGS. 4 through 8. In this embodiment, the restraint system 220 includes a tower member 221, a connecting member 222, and a crossbar member 252 and is adapted to be mounted to a seat frame 223. Seat frame 223 includes a seat support portion 224 connected to a seat back portion 225. Seat frame 223 is also connected to a seat leg portion 226 adapted to be affixed to a surface, such as a school bus floor. Seat support portion 224 is made of bent metal tubing and includes a front portion 228. Rod member 229 extends transversely across seat back portion 225 substantially within the plane defined by seat support portion 224. Seat frame 223 may be wrapped or embedded in cushioning material to provide passenger comfort.

Harness support assembly is made up of tower member 221, connecting member 222, and crossbar member 252, and is mountable to seat frame 223. When so mounted, tower member 221 lies substantially in the plane defined by seat back portion 225, and extends through the plane defined by the seat support portion 224. Rear end 238 of connecting member 222 connects to tower member 221 below the plane defined by seat support portion 224. Front end 237 of connecting member 222 connects to front portion 228 of seat support portion 224. In this embodiment, front end 237 of connecting member 222 features front aperture 241 (FIG. 6a) through which front portion 228 of seat support portion 224 extends. Tower member 221 is pivotally mounted to seat support portion 224 at pivot point 253. In order to accommodate two passengers, a pair of harness assemblies is provided, each with a tower member 221, connecting member 222 and crossbar members 252 and 254.

Rod member 229 extends through tower member 221 and crossbar members 252 and 254. In the preferred embodiment, crossbar member 252 includes two parallel plates lying substantially within the plane of the seat support portion 224 and extending from the front portion 228 to the rod member 229. Proximal end 255 (FIG. 7) of crossbar member 252 includes substantially circular apertures 265 through which front portion 228 of seat frame 223 extends. Distal end 256 of crossbar member 252 includes circular apertures 266 through which rod member 229 extends at pivot point 253. In this embodiment a crossbar coupling member 257 (FIG. 8) connects the plates of member 252. Likewise, a second connecting member 254 is provided consisting of two plates being connected to the second tower member in the same manner as described for member 252.

Tower member 221 comprises a pair of substantially vertically disposed members 258 (FIG. 5c), connected by tower coupling member 260. In other embodiments, tower member 221 may comprise a different number of vertical members. Likewise, in this embodiment connecting member 222 comprises two interconnected portions 259 (see FIG. 5c).

Each connecting member 222 includes a slot 270 (see FIG. 4a) at rear end 238. A pin 272 extends through slots 270 with the opposite pin ends fixed to vertical members 258. The pin slideably connects members 222 to the tower 221. In normal operation, tower member 221 rests within the plane of the seat back 225, tilted slightly rearwards with the pin 272 positioned at the forward end 273 (see FIG. 6a) of the slot 270. As tower member pivots about pivot point 253, pin 272 moves towards the rear of slot 270. Pivoting of tower member 221 is halted when pin 272 reaches rear end 274 of slot 270. The length of slot 270 determines the maximum angle through which tower member 221 may pivot. In this embodiment, the length of the slot 270 is such that the maximum angle through which the tower member 221 may pivot is 17 degrees.

As in the previous embodiment, restraint system 220 also includes guides 248 connected near the top end 231 of tower member 221. Seat belt retractors 249 (FIG. 5b) are fixedly attached to the two vertical members of tower 221. Each seat belt retractor 249 house a torso belt 250, which connect to a tongue 246 in turn connected to lap belt 245. Restraint system 220 also includes a buckle 247 fixedly attached to seat support portion 224 and adapted to lockingly engage tongue 246. Torso belt 250 is extended upwardly from torso belt retractor 249 through guide 248 and downwardly across the torso of a seated passenger while lap belt 245 extends horizontally across the passenger's lap. Alternately, a single belt (not shown) may extend between retractor 249 to anchor 244 with a belt tongue slideably mounted intermediate thereto.

Many variations are contemplated and included in the present invention. In addition to those described in relation to the above embodiments, the present system contemplates including means for preventing premature forward deployment of the tower member 221 relative to the seatback. For example, the top end of tower 221 may be connected to seat back portion 225 limiting relative motion therebetween until sufficient force breaks the top end of the tower apart from the seat back portion.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A vehicle passenger seat restraint system comprising:
   a passenger seat frame mountable to a vehicle;
   a seat belt supporting tower member movably mountable to said passenger seat frame and movable independently therefrom; and
   a seat belt assembly on said frame being attached to said seat belt supporting tower to secure a passenger;
   wherein said tower member is pivotably mountable to said frame and further comprising a connecting member mounted to said passenger seat frame, said connecting member and said tower member having a slot to allow said connecting member and said tower member to intersect; and
   wherein said slot has length and is located on said tower member, said length sized relative to said connecting member which extends therethrough to define a pivot angle through which said tower member may pivot providing a stop means operable to limit movement of said tower member.

2. The system of claim 1 wherein said pivot angle is about 17 degrees.

3. A bench seat harness assembly comprising:

a bench seat frame including:

a seat support portion having a front portion;

a seatback portion coupled to said seat support portion;

a rod member extending across said seatback portion; and a leg portion connected to said seat support portion and adapted to be anchored to a vehicle;

a harness support assembly including:

a tower member having a top end and a slotted bottom end pivotally coupled to said rod member; and a connecting member having a first end extending into said slotted bottom end of said tower member and having a second end connected to said front portion; and an extendable and retractable safety harness attached to said support assembly;

wherein said first end of said connecting member is coupled to said rod member.

4. The assembly of claim 3 further comprising a guide connected to said top end of said tower member, wherein said extendable and retractable safety harness further includes a belt having a first end coupled to said tower member and extending through said guide, a second end connected to said connecting member, and a portion lockably connectable to said seat frame.

5. The assembly of claim 4 further comprising an anchor wing connected to said connecting member, wherein said extendable and retractable harness assembly further comprises a retractable belt extending through said guide and having one end connected to said tower member and another end connected to said anchor wing, and having a tongue member slideably positioned intermediate said one end and said another end and lockably connectable to said side portion.

6. The assembly of claim 3 wherein said slotted bottom end is sized to accept said connecting member and defines a pivot angle through which said tower member may pivot around said rod member.

7. The assembly of claim 6 wherein said pivot angle is about 17 degrees.

8. A vehicle seat providing a passenger passive restraint coupled with a belt assembly providing a passenger active restraint comprising, in combination:

a passenger passive restraint main seat including a seat support frame portion and a seat back frame portion coupled to bend relative to said seat support frame portion, said seat back frame portion being forwardly movable toward said seat support frame portion upon a force being applied thereto; and a passenger active restraint belt assembly connected to said main seat including a retractor, a belt extendable from said retractor across and in front of said seat back frame portion, a tower portion connected to said belt and pivotally coupled to said main seat, a first lock slideably mounted to said belt, a tower-engaging stop connected to said main seat and adapted to limit forward pivoting of said tower to about 17 degrees and a second lock adapted to releasably lockingly engage said first lock to hold a passenger on said main seat.

9. A vehicle seat providing passenger passive restraint coupled with a belt assembly providing passenger active restraint comprising in combination:

a passenger passive restraint main seat with a seat support frame portion and a seat back frame portion said seat back frame portion being bendable forward toward said seat support frame portion upon a force being applied thereto;

a passenger active restraint belt assembly mounted to said main seat having a retractor, a first lock a belt extendable from said retractor and a second lock on said belt said belt extending in front of and across said back frame portion when said second lock is locked to said first lock to hold a passenger on said seat;

a tower portion connected to said belt assembly and pivotally coupled to said main seat;

a tower-engaging stop connected to said main seat;

wherein said tower portion is adapted to pivot forward in response to a forward-acting force exerted thereupon; and wherein said tower-engaging stop is adapted to limit the forward pivoting of said tower portion to about 17 degrees.

10. The vehicle seat of claim 9 wherein said tower-engaging stop includes:

a connecting member having a first end slideably connected to said tower portion and a second end connected to said seat support frame portion; and a crossbar member having a proximal end connected to said connecting member and a distal end connected to said tower portion.

11. The vehicle seat of claim 10 wherein said connecting member has a slot with length and said tower portion has a pin, wherein said pin extends through said slot.

12. The vehicle seat of claim 11 wherein the length of said slot defines a pivot angle through which said tower member may pivot.

13. The vehicle seat of claim 12 wherein said pivot angle is about 17 degrees.

* * * * *